J. H. BRUNINGA.
FASTENER AND SLUG INSERTING MACHINE.
APPLICATION FILED NOV. 15, 1918.

1,394,467.

Patented Oct. 18, 1921.

Inventor:
John N. Bruninga

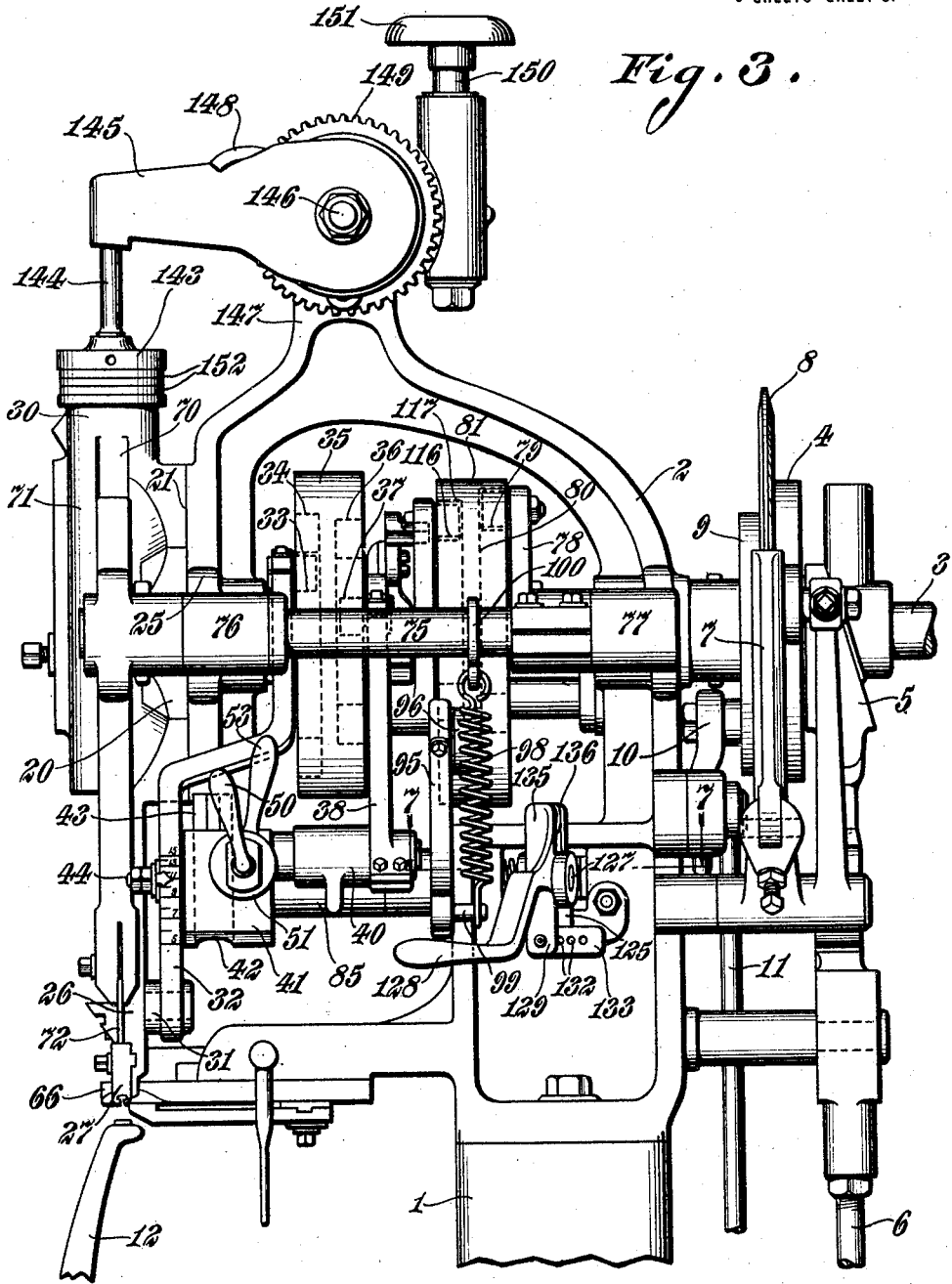

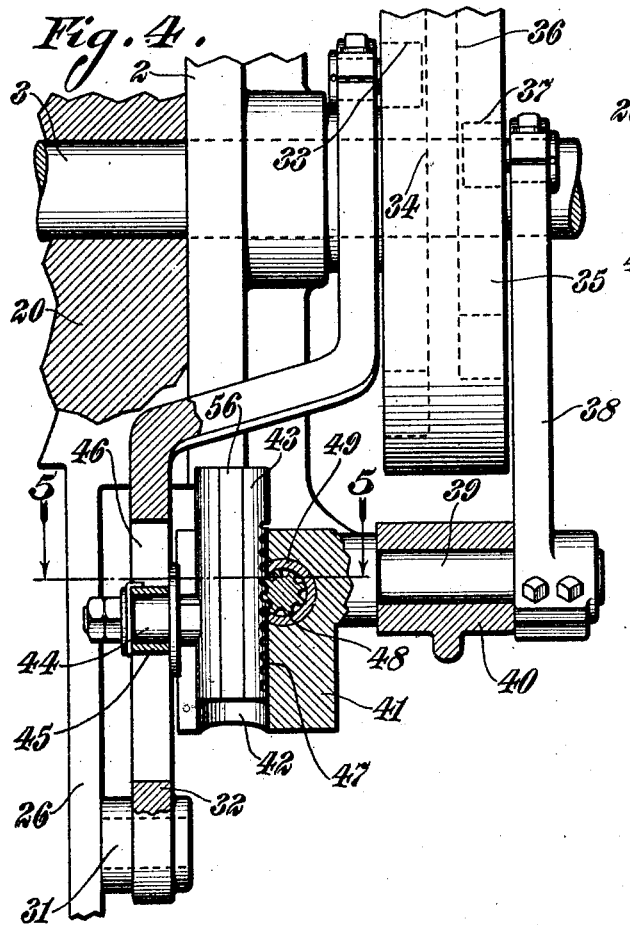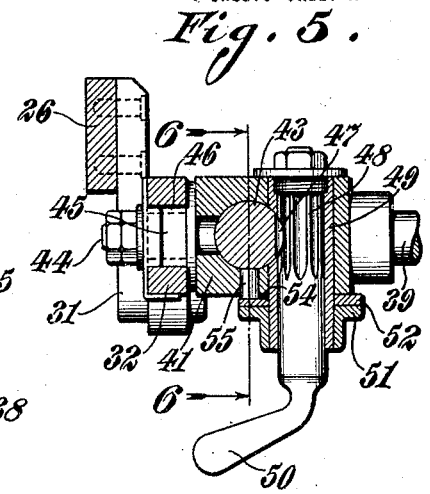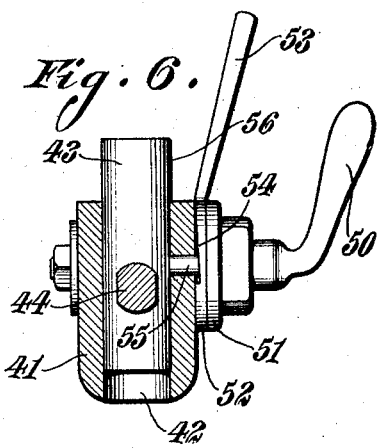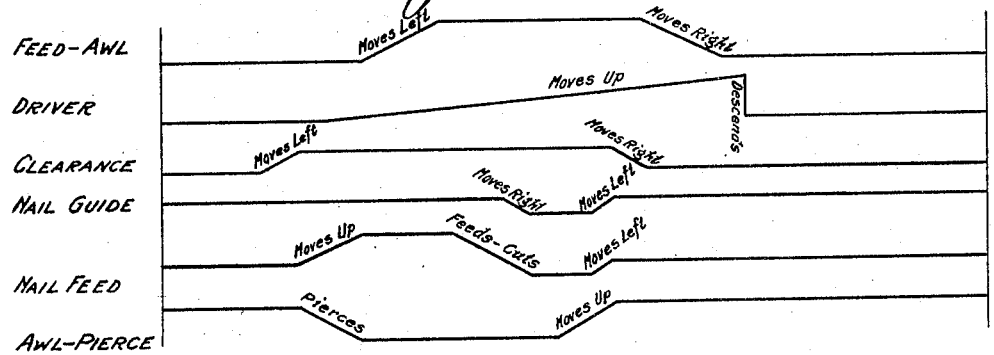

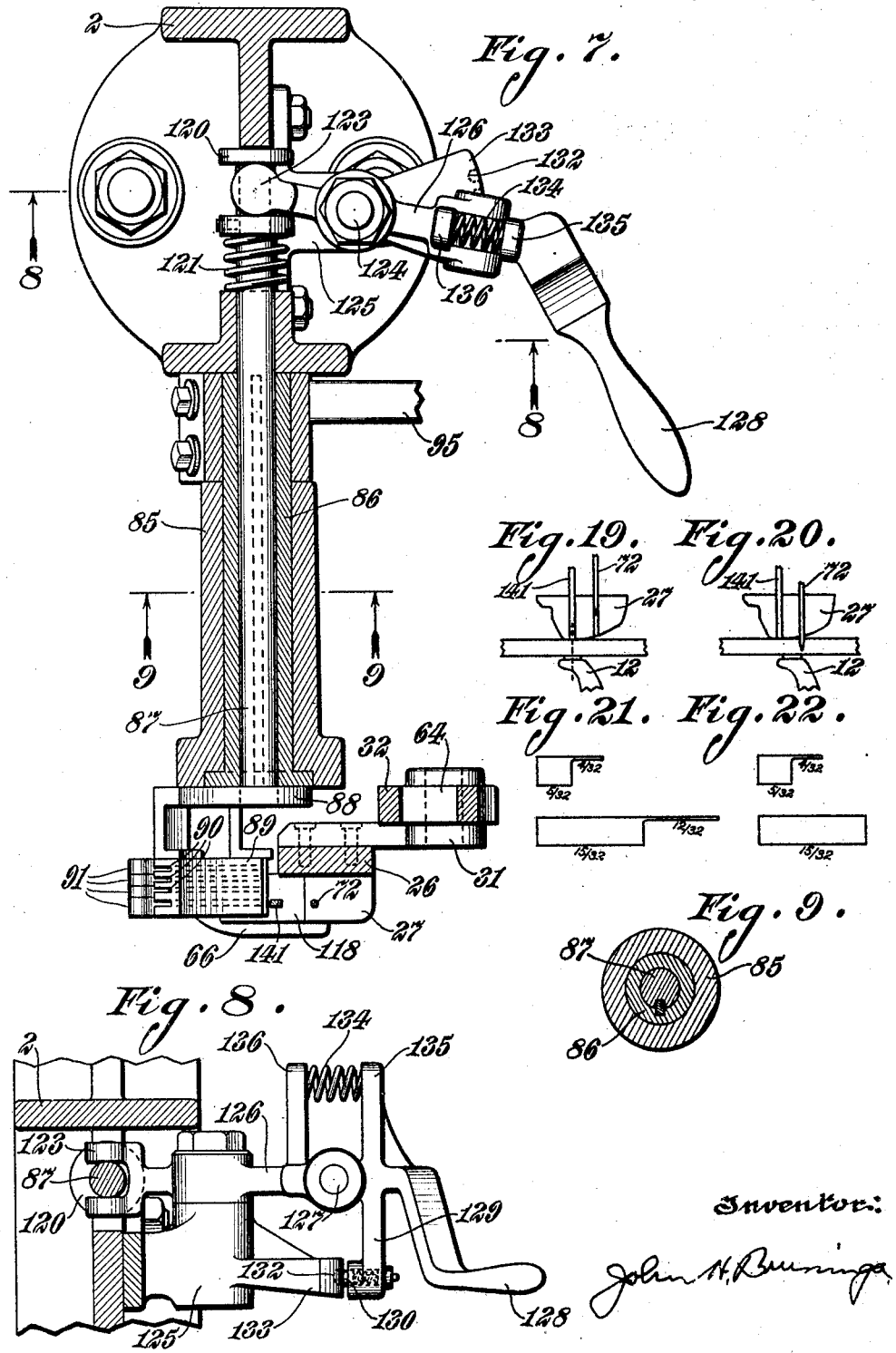

J. H. BRUNINGA.
FASTENER AND SLUG INSERTING MACHINE.
APPLICATION FILED NOV. 15, 1918.

1,394,467.

Patented Oct. 18, 1921.
9 SHEETS—SHEET 6.

Inventor:
John H. Bruninga

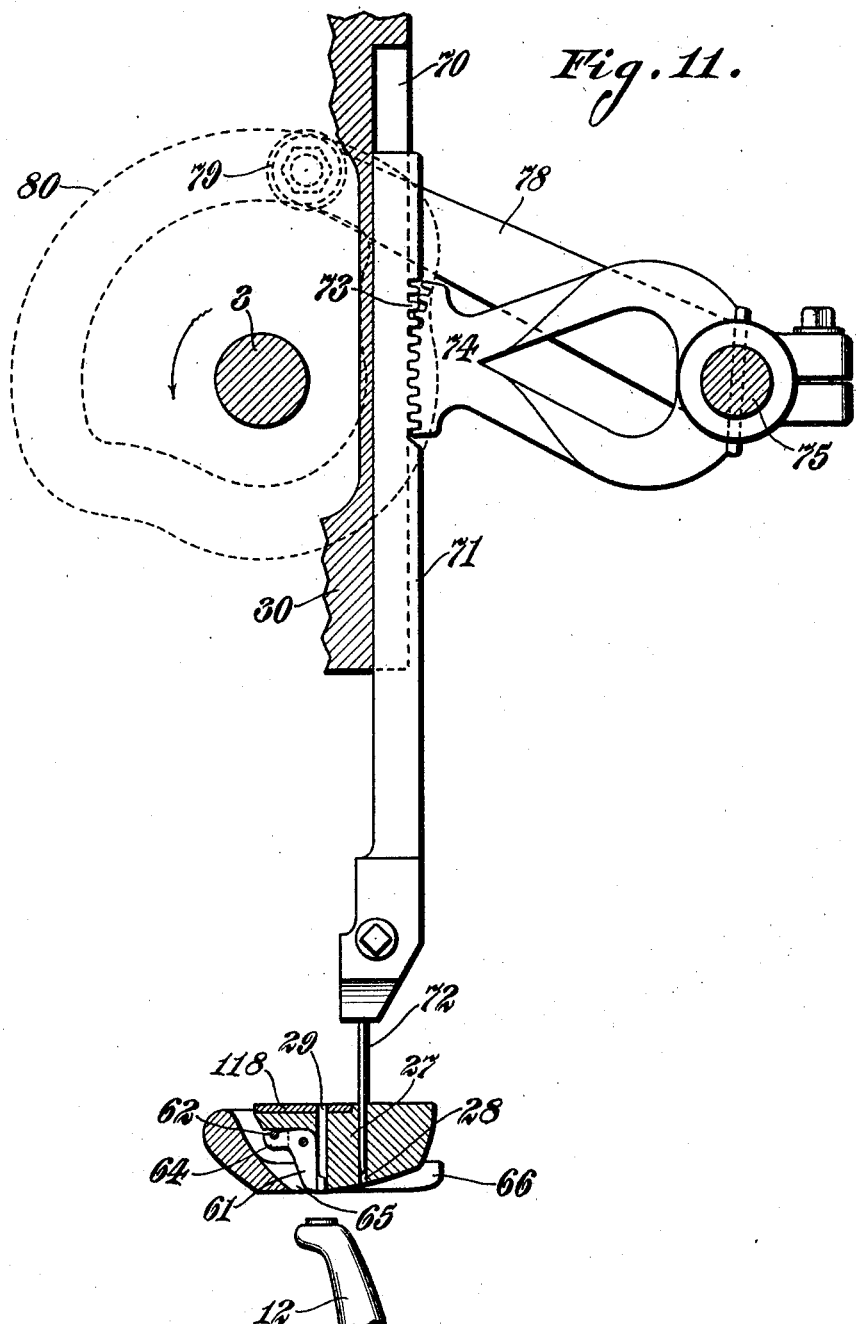

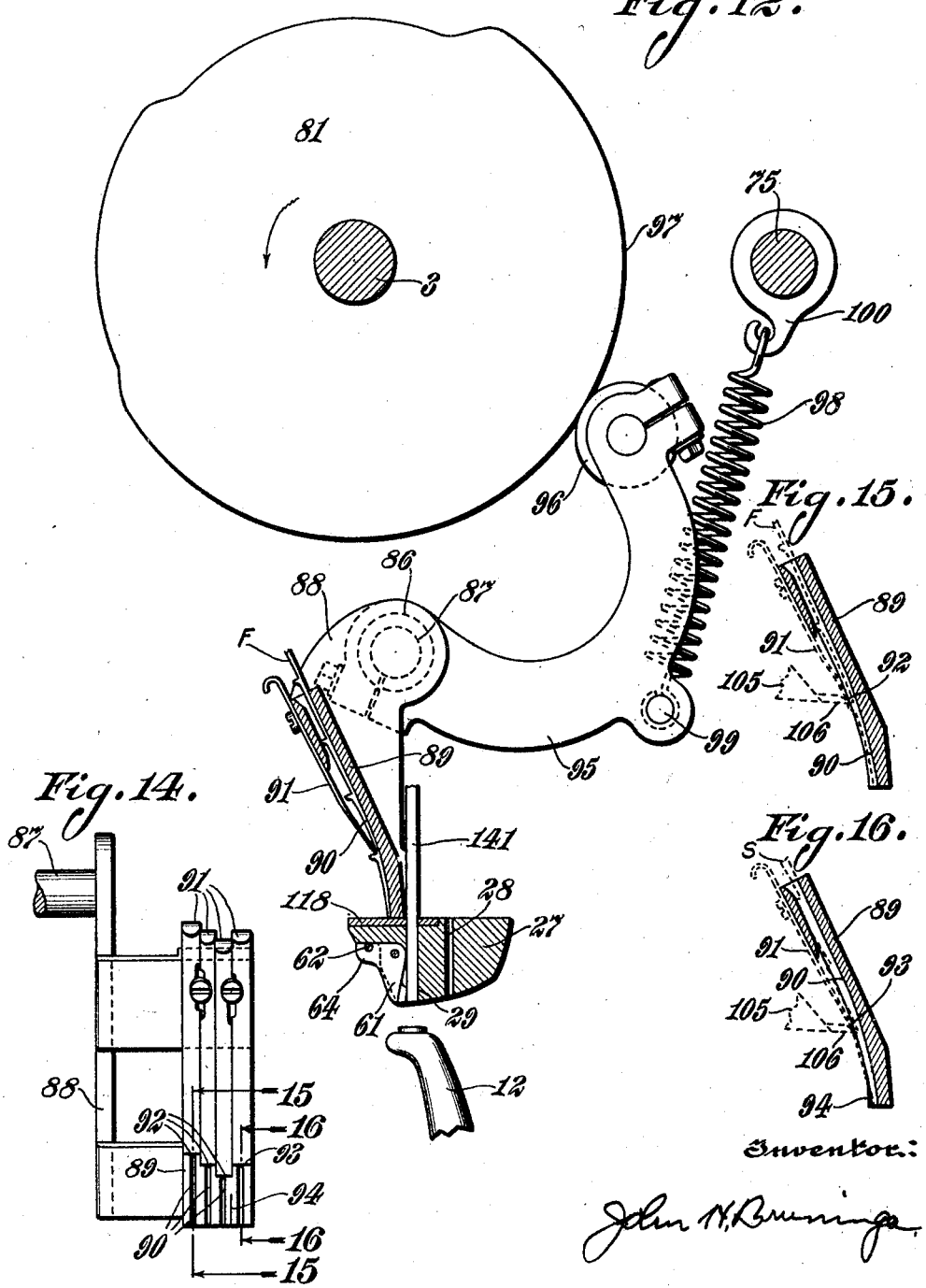

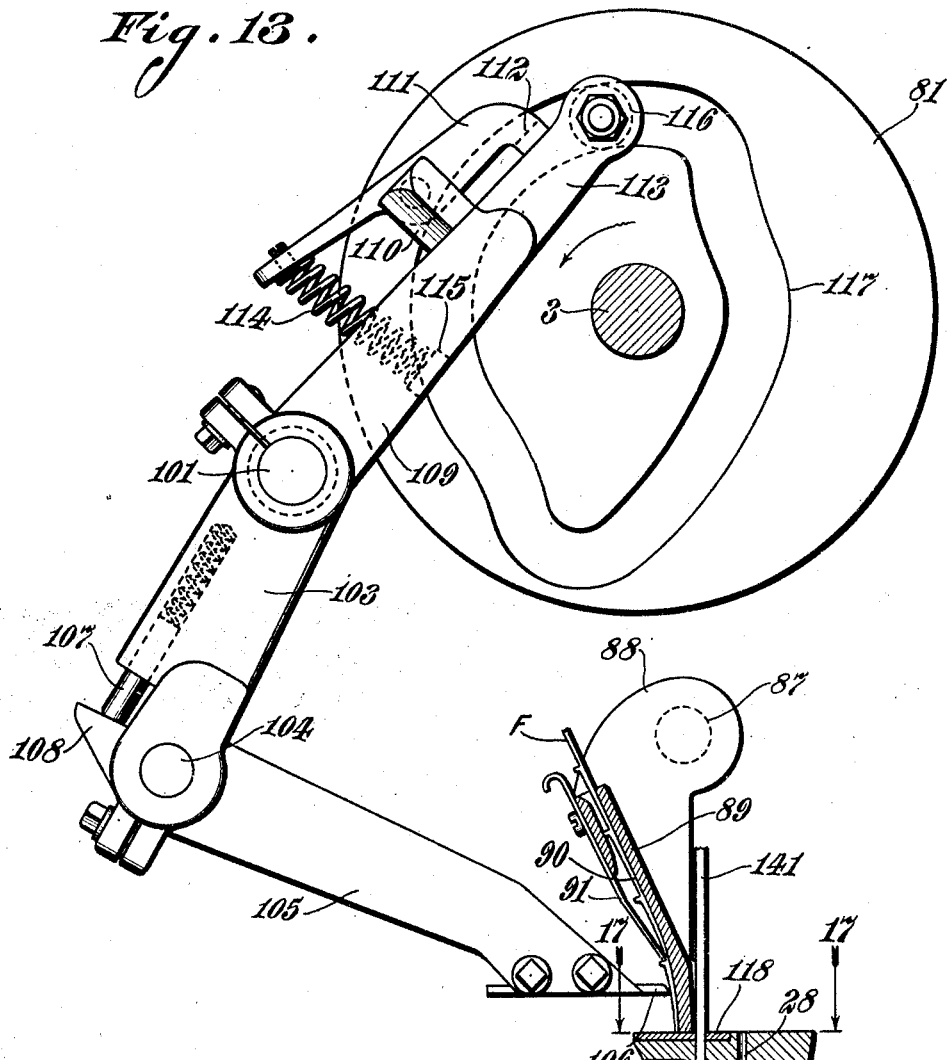
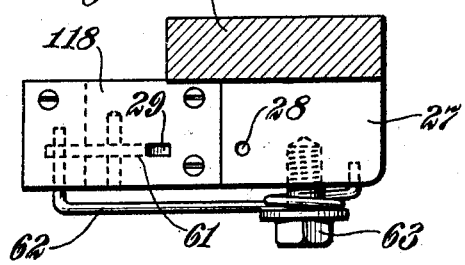

UNITED STATES PATENT OFFICE.

JOHN H. BRUNINGA, OF ST. LOUIS, MISSOURI, ASSIGNOR TO CHAMPION SHOE MACHINERY COMPANY, OF ST. LOUIS, MISSOURI, A CORPORATION OF MISSOURI.

FASTENER AND SLUG INSERTING MACHINE.

1,394,467.   Specification of Letters Patent.   Patented Oct. 18, 1921.

Application filed November 15, 1918. Serial No. 262,688.

*To all whom it may concern:*

Be it known that I, JOHN H. BRUNINGA, a citizen of the United States, and residing at St. Louis, Missouri, have invented the new and useful Improvement in Fastener and Slug Inserting Machines, of which the following is a specification.

This invention relates to machines for inserting fasteners and slugs, and more particularly to machines adapted for operation on boots and shoes.

Metallic machines as used on boots and shoes, are used for two distinct operations, namely, sole attaching and slugging operations. In the sole attaching operation, the fastener is driven through the sole and clenched on the insole, while in the slugging operation, a series of wear resisting slugs are driven along the edge of the sole or heel to form a wear resisting surface. In the sole attaching operation, a headed fastener, that is, a fastener having a laterally projecting head, must be used in order to provide an anchorage in the outsole; the anchorage in the insole is, however, provided by the clench of the fastener point on the anvil. In the slugging operation, it is unnecessary to provide the slug with a head, since it performs only the function of a wear resisting member, and not of a fastening member. For economical reasons, therefore, the head is omitted.

In the sole attaching operation, the spacing of the fasteners is considerable, while in the slugging operation, the slugs are driven close together, sometimes as close as one-eighth of an inch. Now where a metallic machine is adapted for both of these operations, as is for instance the case in repair shops, where duplication of machines, for economical reasons, is not desired, it is necessary to vary the feed considerably; sometimes this feed varies from three-thirty-seconds of an inch for slugging, to fifteen-thirty-seconds of an inch for sole attaching. Now since an awl feed machine necessarily requires a construction in which the awl and the throat are movable into and out of the line of drive, a certain clearance movement must necessarily be given to the awl, on account of the thickness of the throat wall between the driver passage and the awl. With the ordinary constructions providing for a variation in feed, the clearance must, of course, necessarily increase with the feed movement, so that with a maximum feed, the total movement given to the awl is necessarily great, resulting in great vibration and wearing of the awl cam. For these reasons, therefore, the successful operation of a machine for interchangeably inserting fasteners or slugs, requires the design of special mechanism for imparting a work feeding movement to the awl, but in such a manner as to reduce the total movement to a least possible minimum.

One of the objects of this invention, therefore, is to provide and produce a machine, utilizing strings of connected fasteners and connected slugs, which is so constructed and arranged as to selectively permit the formation from a selected fastener string or slug string, of a fastener or slug, and the driving of such a formed fastener or slug into the work.

Another object is to provide a machine of this type with an awl feed mechanism, which is constructed and arranged for control, to adapt the machine for either fastening or slugging operations.

Another object is to provide a fastener inserting mechanism, in which the awl mechanism is so constructed and arranged as to reduce the effective travel of the awl to a minimum, at the same time permitting adjustment of the awl from a minimum to a maximum feed movement.

Another object is to provide a string nailing machine employing a movable head which carries the fastener inserting mechanism, which has a throat and coöperating therewith a driver, an awl and mechanism constructed to move the awl and fastener inserting mechanism alternately into and out of the line of drive, together with string nail guiding, feeding and cutting mechanism, so coördinated with the movable head and the mechanism thereon as to work in harmony therewith.

Further objects will appear from the detail description, taken in connection with the accompanying drawings, in which:

Fig. 3 is an elevation from the right side of the machine;

Fig. 4 is a section on the line 4—4, Fig. 1;

Fig. 5 is a section on the line 5—5, Fig. 4;

Figure 10:
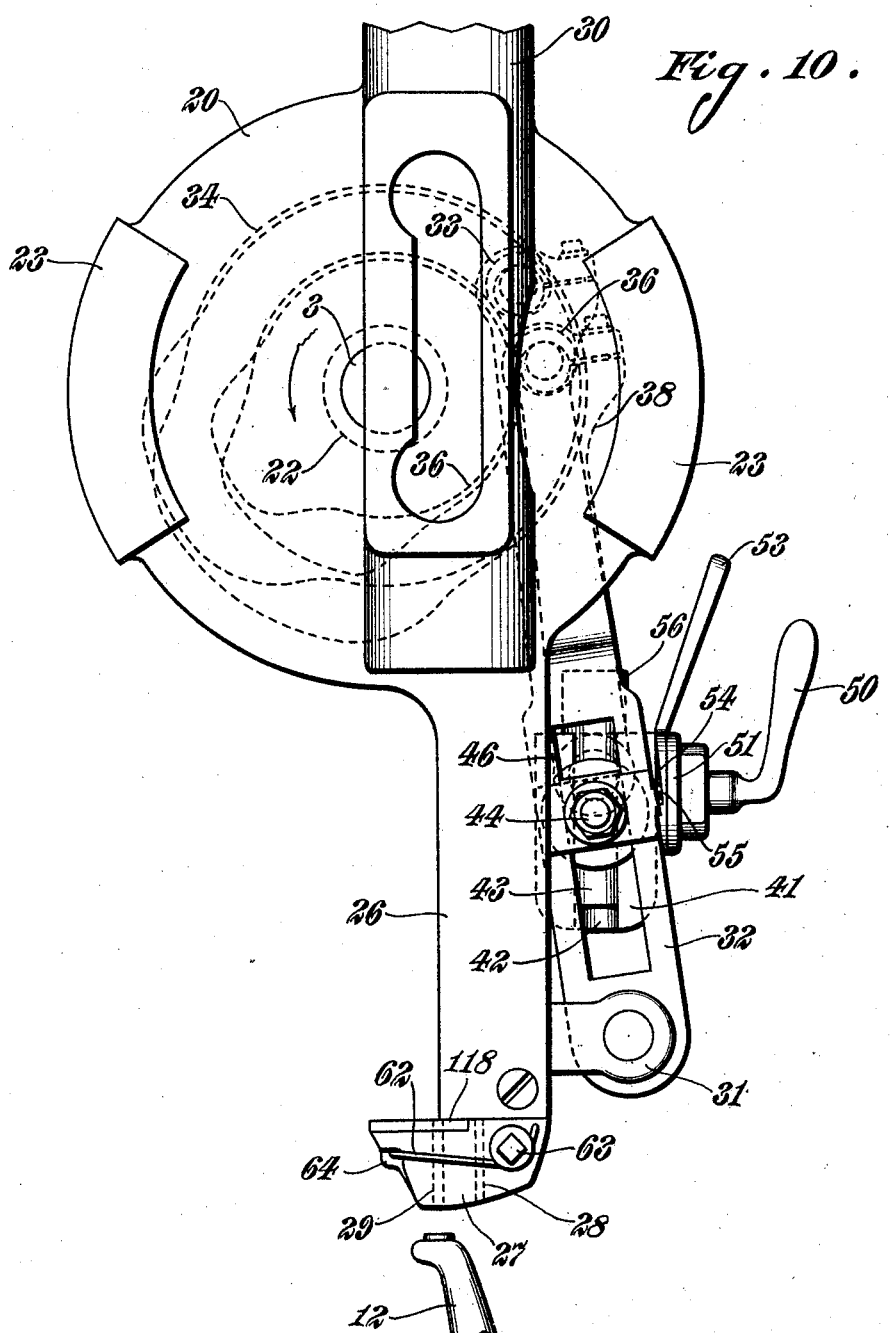

Fig. 6 is a section on the line 6—6, Fig. 5;
Fig. 7 is an enlarged section on the line 7—7, Fig. 3;
Fig. 8 is a section on the line 8—8, Fig. 7;
Fig. 9 is a section on the line 9—9, Fig. 7;
Fig. 10 is a detail of the movable head;
Fig. 11 is a detail of the awl mechanism;
Fig. 12 is a detail of the string nail guiding mechanism;
Fig. 13 is a detail of the string nail feeding and cutting mechanism;
Fig. 14 is a detail side elevation of Fig. 12;
Fig. 15 is a section on the line 15—15, Fig. 14;
Fig. 16 is a section on the line 16—16, Fig. 14;
Fig. 17 is a section on the line 17—17, Fig. 13; and
Figs. 18 to 22 inclusive are diagrammatic views, showing the operation of the machine.

Figure 1:
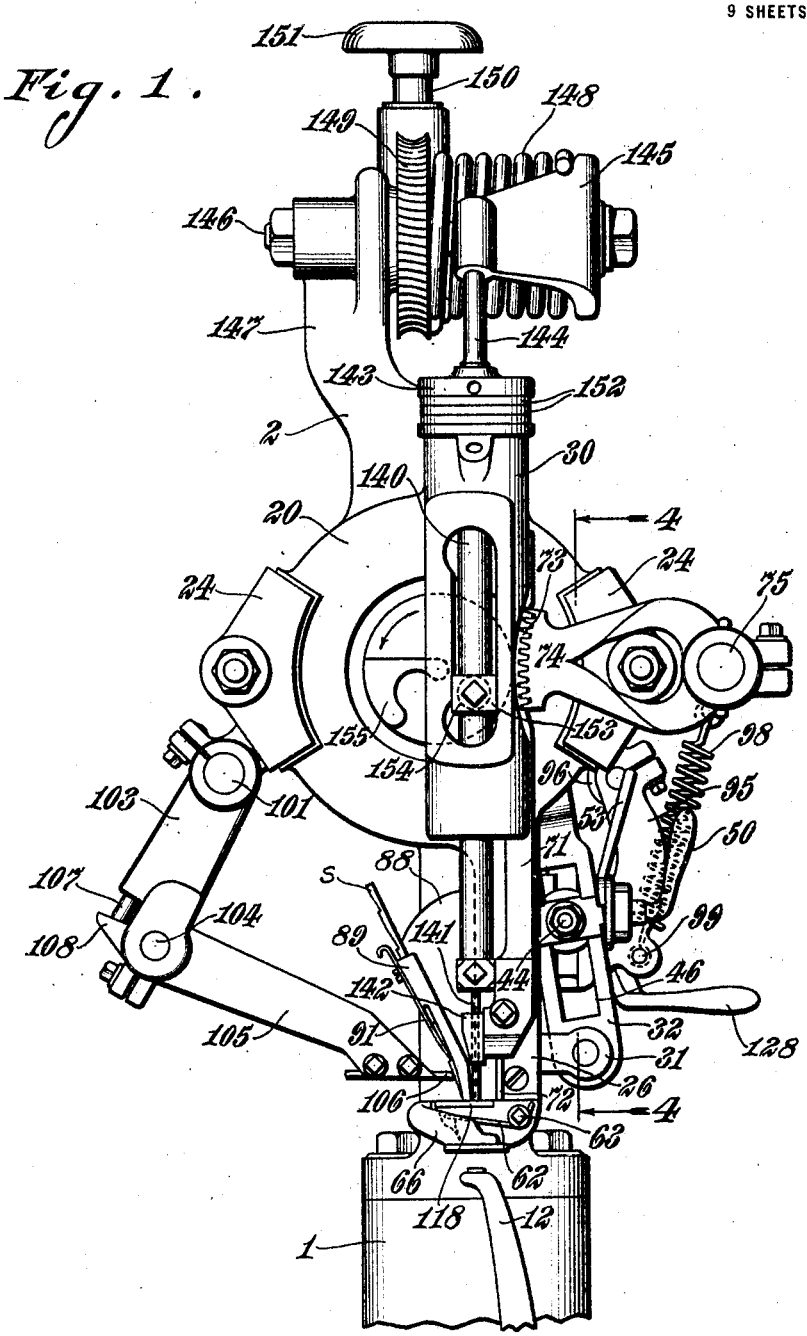
Figure 1 is a front elevation of a machine embodying this invention.
Figure 2:
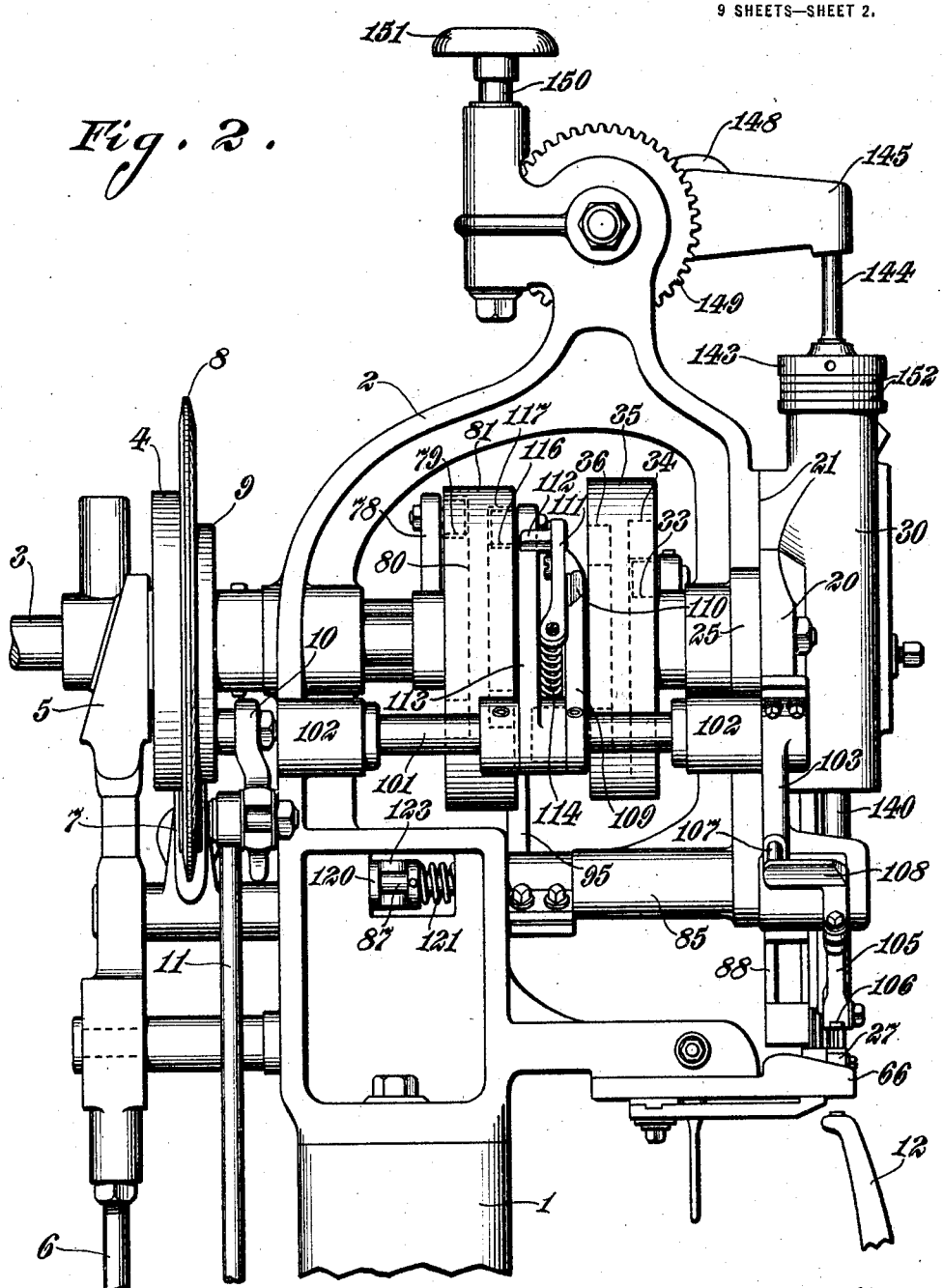
Fig. 2 is an elevation from the left side of the machine.

Referring to the accompanying drawings, and more particularly, to Figs. 1 to 3 inclusive, 1 designates a column supporting the frame or machine head 2, which carries the operating mechanisms. Mounted in this frame is a main drive shaft 3, which is provided with any suitable clutch 4, controlled by a shifter 5, operated by a shifter rod 6, connected to a suitable treadle (not shown) on the base of the machine, which treadle also controls a brake 7, coöperating with a brake surface 8 on the shaft. A cam 9 fixed to the shaft is provided with a cam groove engaging a cam roll on an arm 10, pivoted on the machine frame and connected by suitable mechanism with a link 11, in turn connected with a horn or work support 12 so as to intermittently depress the horn during the operations of the machine, and during the feed, this horn being raised by a suitable spring (not shown), as is usual in machines of this type.

*The movable head.*

Referring to Figs. 1, 2, 3, 4, and 10, mounted for movement about an axis concentric with the shaft 3 is a movable head 20. This head has a machined face 21 coöperating with a coöperating machined face on the front of the frame 2, and is provided with a short tubular shank 22 seating in a corresponding recess in the frame 2. The head has machined faces 23 engaged by gibs 24 bolted to brackets 25 on the frame 2, so as to guide the head in its movement and retain it against the frame. The head is provided with a downwardly extending arm 26, having secured thereto a throat 27 provided with an awl passage 28, and a driver passage 29, and is further provided with a tubular bearing 30 for a driver bar, as hereinafter described.

Secured to or formed on the arm 26 is a bearing lug 31 to which is pivotally connected a feeding arm 32 provided at its upper end with a cam roll 33 engaging a cam groove 34 in a cam wheel 35 fixed to the shaft 3. This cam wheel is provided at its opposite face with another cam groove 36 engaging a cam roll 37 on a clearing arm 38 fixed to a rock shaft 39 mounted in a bearing 40 on the frame 2. This rock shaft is provided with a crank 41 having a guide way 42 for a shank 43 provided with a stud 44 carrying a block 45 sliding in a guide way 46 in the feeding arm 32.

The shank 43 is provided with teeth 47 meshing with a toothed shaft 48 mounted in a bushing 49 in the crank 41 and provided with an arm 50. Mounted between a nut 51 and the crank 41 is a plate 52 provided with an arm 53 and with a cam surface 54 engaging a locking pin 55, which slides freely in a bore in the crank and bears against the flat portion 56 on the shank 43. The cam rolls 33 and 37 are mounted on studs which are eccentrically mounted in the ends of the arms 32 and 38 respectively, the ends of these arms adapted to be clamped on the eccentric studs. This enables the cam rolls to be adjusted with respect to the cam grooves and locked in adjusted position.

Upon rotation of the drive shaft 3, the head is swung on the axis of the shaft as a pivot; it will, however, be noted that this movement is accomplished by the action of both cams 36 and 34, these cams being so positioned (as shown in Fig. 10) as to successively move the arms 38 and 32 respectively so as to cause the cam 36 to first move the head and after this movement has terminated to cause the cam 34 to then move the head. As hereinafter described, the function of the cam 36 and its connections is to impart a clearing movement to the head, while the function of the cam 34 and its connections is to impart a feeding movement to the head. The amplitude of the movement of the head will vary in accordance with the position of the block 45 in the way 46, and it will be noted that when this block is moved down, the feeding movement will be decreased, while the clearing movement will be increased; vice versa, if the block is moved up, the feeding movement will be increased, while the clearing movement will be decreased, the clearing movement being reduced to zero when the center of the stud 44 reaches the center line of the rock shaft 39, that is, the line 5—5, Fig. 4. The block can, of course, be adjusted by manipulation of the arm 50 by first loosening the clamping action of the locking pin 55 through the manipulation of the arm 53, and the parts can then be locked in position in the same way.

It will be noted that while the actuators 38 and 32 are separate and independent and operated from different cam grooves, they are interconnected, so that there are maintained connections between these actuators and the movable head 26, as distinguished from lost motion connections. Accordingly, the machine is capable of operating at a high speed without vibration, which is not possible where lost motion connections are employed.

Referring to Fig. 22, it will be noted that although for maximum feed the clearing movement or component has been entirely eliminated, whereas, for minimum feed, this clearing movement or component is present; nevertheless, the total movement of the head for minimum feeding movement is less than the total movement for maximum feeding movements. Accordingly, variation in the feeding movement is adapted to vary the total movement of the awl in the same sense, while the clearing movement is varied in the opposite sense as the feeding movement and the total movement.

The throat.

Referring to Figs. 1 and 11, the throat 27 is provided with a driver passage 29, in which is pivoted a retainer 61 for retaining the fastener, this retainer being held in position by a spring 62 mounted at 63 on the throat and engaging the toe 64 of the retainer. The throat moves in a slot 65 in the presser foot 66, which extends forwardly from and is fixed to the frame 2. This throat is adapted to receive either a string fastener or a string slug.

The awl mechanism.

Referring to Figs. 1, 3 and 11, sliding in a bearing 70 in the tubular bearing 30 is an awl bar 71 having clamped to its lower end an awl 72, which moves in the awl passage 28 in the throat 27. This awl bar is provided with a toothed rack 73 meshing with a segment 74 fixed to the rock shaft 75 mounted in bearings 76 and 77 on the frame. This rock shaft 75 has fixed thereto an arm 78 bearing a cam roll 79 in a cam groove 80 in a cam wheel 81 fixed to the drive shaft 3. The connections are, therefore, such that the cam wheel 81 will impart a reciprocating movement to the awl and the awl bar thereon so as to project and retract the awl through and again into the throat.

The feeding and cutting mechanism.

Referring to Figs. 1, 2, 7, and 12 to 17 inclusive, mounted in a bearing 85 in the frame 2 is a rock shaft 86 which has splined thereto a rock shaft 87 so as to move therewith. Fixed to the outer end of the shaft 87 is a carrier 88 supporting a plate 89, which is provided with a series of grooves 90 for receiving a series of strings F and S, the strings F being fastener strings, each formed with a laterally projecting head to form a headed fastener, while the slug strings S have the head omitted. Clamped to the guide plate 89 is a retainer 91 provided with a series of stops 92, each adapted to engage the head on the fastener string F, the stops being so positioned as to stop the heads at different distances from the end of the guide, while the stop 93 is provided to stop to engage the head end of a slug on the string S, so as to stop the slug at a point spaced from the end of the guide, a distance equal to the length of the slug. The plate 89 is undercut at the slug groove as shown at 94 so as to permit engagement of the feeding and cutting blade with the heads on the slug string.

Fixed to the rock shaft 86 is an arm 95 provided with a cam roll 96 engaging a cam face 97 on the cam wheel 81. This cam roll is held in engagement with the cam face by a spring 98 connecting a pin 99 on the arm with a collar 100 on the rock shaft 75. The cam wheel 81, therefore, operates to oscillate the carrier 88 and with it the string nail guide so as to move this string nail guide into and out of alinement with the driver passage.

Fixed to the rock shaft 101 mounted in bearings 102 on the frame 2 is an arm 103. This arm has pivoted thereto at 104 a downwardly extending arm 105 provided with a sharpened blade 106 adapted to engage the string nail guide. The arm 103 is provided with a spring pressed plunger 107 bearing against the toe 108 on the arm 105 so as to operate to hold the blade 106 against the string nail guide. Fixed to the rock shaft 101 is an arm 109 provided with a lug 110 on which is pivoted an arm 111, provided with a laterally turned lug 112 bearing against the arm 113 loosely mounted on the rock shaft 101 and held in engagement therewith by a spring 114 between the arm 111 and a lug 115 on the arm 109. The arm 113 is provided with a cam roll 116 engaging a cam groove 117 in the cam wheel 81. The connections are, therefore, such that the cam wheel 81 will operate by oscillation of the arm 103 to move the blade 106 along the string nail guide, and the force applied is such as to tend to move the blade to the right (Fig. 13) for a purpose hereinafter to be described. The throat 27 has mounted on its upper face a plate 118 which is hardened to form a die, and is, therefore, adapted to form a cutter coöperating with the blade 106 to cut the end nail or slug from the string, as hereinafter more fully described.

The guide shifting mechanism.

Referring to Figs. 1, 3 and 7, as heretofore described, the string nail guide is mounted on a shaft 87 which has a splined connection with the rock shaft 86. This compels the shaft 87 and the guide to oscillate with the rock shaft, but permits endwise movement of the shaft 87 in the rock shaft 86. This is for the purpose of permitting the guide to be shifted in order to aline any one of its string nail grooves with the driver passage.

The shaft 87 has fixed thereto a grooved collar 120, which is engaged by a spring 121 on the shaft 87 and bearing against the arm so as to normally tend to move the shaft 87 up (Fig. 7) so as to hold the slug string guide groove in alinement and the driver passage and the blade 106. This collar is engaged by an arm 123 of a lever pivoted at 124 on a bracket 125 mounted on the frame 2. The other end 126 of this lever has pivoted thereto at 127 a handle 128, so that by manipulation of the handle 128, the lever may be swung on its pivot 124 to shift the shaft 87 endwise in order to shift the string nail guide 89 so as to aline any selected fastener or slug groove with and in coöperative relation with respect to the feeding and cutting blade 106 and the throat 27. In order to lock the coöperating lever 126 and, therefore, the string nail guide in any position of adjustment, the handle 128 is provided with an extension 129 bearing a spring pressed plunger 130 adapted to engage with and enter a series of depressions 132 in a sector 133 on the bracket 125. To firmly hold the plunger 130 in its depressions the spring 134 is provided to engage at one end of an extension 135 on the arm 128 and at its other end with an extension 136 on the lever 126. The operator can at pleasure by manipulation of the handle 128, shift the string nail guide to aline any one of the guide grooves in alinement with the feeding and cutting blade and the throat, and the parts will be locked in any position of adjustment.

*The driving mechanism.*

Referring to Figs. 1, 2, and 3, the tubular bearing 30 has mounted to slide therein a driver bar 140, which is provided with a driver 141 adapted to enter the driver passage in the throat, a guide 142 mounted on the frame 2 receiving and guiding this driver close to the driver passage. The driver bar is provided with a head 143 connected by a flexible link 144 with an arm 145 loosely mounted on a shaft 146 on a bracket 147 on the frame 2, and engaged by one end of a coiled spring 148, the other end of which is connected with a worm wheel 149 engaged by a worm 150 on the bracket 147 and provided with a hand wheel 151. Washers 152 are interposed between the head 143 and the tubular bearing 30. The driver bar has clamped thereto a collar 153 provided with a cam roll 154 adapted to be engaged by a cam 155 on the drive shaft 3. The construction is such that the cam 155 will raise the driver bar with the driver out of the passage, against the tension of the spring 148, and will, thereafter release the driver bar by moving out of engagement with the cam roll 154 when this driver is moved downwardly by the tension of the spring 148. The washers 152, which are preferably constructed of leather, take up the impact while the tension of the spring may be adjusted by the manipulation of the hand wheel 151.

*General operations.*

Referring more particularly to Figs. 18 to 22 inclusive, and starting with the awl up, the throat in the line of drive, the driver down with the driving of the last nail completed, and the feeding and cutting member moving upwardly, the cycle of operations will be as follows.

The head will be moved to the left by the clearing cam from the position shown in Fig. 19 to the position shown in Fig. 20, thereby executing a clearing movement, the awl remaining raised and out of the work during this movement. At this time, the horn is still raised to clamp the work, and the awl will now be moved down to pierce the work and form therein a puncture to receive the nail. The horn is now depressed to unclamp the work, and the head will now be given a feeding movement by the feeding cam to feed the work and position the puncture in the line of drive passing through the center of the horn. During this lateral movement of the head, the throat will have been swung to position the driver passage therein out of the line of drive. The puncture having been placed in the line of drive with the feeding movement of the work completed, the awl is retracted and moves out of the work, and the horn is now released to clamp the work against the presser foot. The clearing and feeding cams now act successively to return the head and the throat, thereby to position the driver passage in the line of drive. While the throat is out of the line of drive, it is moved into alinement with the string nail guide and this string nail guide will have been positioned by its cam to permit such alinement, and the feeding and cutting member will feed a string of connected nails into the driver passage, the feeding and cutting member moving down until it engages the top of the throat and thereafter moving to the right (Figs. 1 and 13) to cut the string so positioned. At the time that the feeding and cutting member moves along the nail guide, the nail guide will be restrained by its cam, but when the feeding and cutting member engages the top face of the throat, the nail guide is permitted to move to the right by a depression in its cam, and the pressure of the feeding and cutting member against the bottom of the nail guide and the spring 98 will move this nail guide to the right, thereby causing the feeding and cutting member to coöperate with the die on the throat to cut the string thus positioned in the driver passage. During the movement of the driver passage out of the line of drive, the driver will have been raised by its cam against the tension of its spring to clear the throat to permit feeding of the string therein. As the throat moves back into the line of drive, carrying the cut nail positioned therein, the driver will be released to drive the fastener or slug positioned in the driver passage into the puncture formed in the work and positioned at this time in the line of drive. This completes the cycle of operations.

*The clearing and feeding movements.*

As pointed out above, in an awl feed machine, it is necessary that the throat and awl be movable into and out of the line of drive, so as to position the awl hole in the line of drive to receive the fastener or slug. The distance between the center of the awl and the center of the driver passage in the throat cannot, however, for constructional reasons, be less than a given amount; as a matter of fact, in a substantially constructed shoe machine, this distance cannot be less than nine-thirty-seconds of an inch. This can readily be seen on reference to Figs. 19 and 20. Now if it is desired to space the fasteners, such as slugs, less than the distance between the awl and the driver passage, then it is necessary to move the awl laterally while it clears the work, a distance equal to the difference between the spacing of the awl and the driver passage and the desired feed of the work. In other words, the awl must be moved in such a case, in successive steps, one of which is a clearing step, and the other is a work feeding step, the awl being moved downwardly to pierce the work during the dwell between the steps.

Where a single cam is used to move the awl laterally through both successive steps with a dwell therebetween, then the clearing and feeding movement have fixed definite relations, so that one will necessarily increase with the other. Thus, whereas in Fig. 21, (top diagram) the machine is set, for instance, for its minimum feed of five-thirty-seconds of an inch, the clearing movement must necessarily be four-thirty-seconds of an inch. If now the machine is set for, for instance, the maximum feed, Fig. 21, (lower diagram) of say, fifteen-thirty-seconds of an inch, then the clearing movement will necessarily be twelve-thirty-seconds of an inch. In other words, the total travel of the awl for a maximum feed will be twenty-seven-thirty-seconds of an inch, that is, nearly twice the effective feed movement of the awl. In view of the fact, however, that these machines are made to run at high speeds, such an excessive travel of the awl and its supporting head, causes undue vibration of the machine, very soon wears out the cam, and in fact, tears the machine to pieces.

In accordance with this invention, the head is moved laterally in successive steps with an intervening dwell. The first step is a work clearing step and the awl is at that time clear of the work; the second step is a work feeding step and the awl is at that time in the work. Separate actuating cams are provided for imparting to the head these separate successive movements. Adjusting or controlling mechanism is provided for adjusting or controlling the feed movement of the head, and this also adjusts or controls the clearing movement; the clearing movement, however, decreases as the feeding movement increases, from a maximum clearing movement, corresponding to a minimum feeding movement, to zero clearing movement, corresponding to maximum feed movement of the awl.

Fig. 22 shows the actual operation. The cam grooves 36 and 34, and the arms 32, 38 and 41, are so proportioned, that with a minimum feed, the clearing movement of the head will be sufficient, so that the feed movement plus the clearing movement will equal, or be slightly greater than, the distance between the center of the throat and the center of the awl. Thereafter, with an increase of feed, as pointed out heretofore, the clearing movement will decrease uniformly, so that with a maximum feed movement, as shown in the lower diagram Fig. 22, the total movement of the head will be a feeding movement, in that the clearing movement is at this time reduced to zero, on account of the fact that the stud 44 is at this time opposite the center of the shaft 39.

It will, therefore, be seen that with this construction, the maximum movement of the head can never be greater than the maximum feed movement of the awl, so that this maximum movement is nearly cut in half, as compared to a construction in which a single cam groove or actuator is used, as illustrated in Fig. 22. With this construction, therefore, the vibration of the head is reduced to a minimum.

*Adjustment for fastener and slugging operations.*

In order to adjust the machine for either fastening or slugging operations, it is necessary not only to shift the string nail guide, but also to shift the work feeding mechanisms. Those two mechanisms, therefore, constitute the dominating mechanisms which selectively adapt the machine to either fastening or slugging operations. In order, for instance, to adapt the machine for fastening operation, the string nail guide is shifted to shift any selected fastener guiding groove in coöperative relation with respect to the feeding and cutting mechanism, and with respect to the throat; the work feeding mechanism is, however, also shifted, adjusted or controlled, so as to adapt the operation of the awl to the position to which the nail guide is shifted. Thus, for instance, the nail guide is shifted to permit the forming and driving of a certain size of fastener, and the work feeding mechanism is adjusted or controlled to bring the work feeding mechanism in accord with the selected fastener. This means, of course, that for fastener operation, the feed of the work must be increased to a maximum, and this can be accomplished with the awl feed mechanism embodying this invention, with a minimum movement of the actuating mechanism, on account of the fact that the clearance movement decreased to a minimum with the increase of the awl feeding movement required for the fastening operation.

When it is desired to convert the machine into a slugging machine, the operator will shift the string nail guide to position the slug string groove in proper coöperative relation with the feeding and cutting mechanism and the throat in order to position the slug string in the line of drive; the work feeding mechanism is also, at this time, adjusted to a minimum, so as to adjust the feeding movement of the awl in accordance with the position of the string nail guide, in order to adapt the machine for slugging operation. The clearing movement of the awl is, of course, at this time, a maximum, but since the feeding movement is a minimum, the total movement of the awl is not excessive, and is, in fact, a minimum.

It will, therefore, be seen that the invention accomplishes its objects. An awl feed string nailing machine is produced which utilizes strings of connected fasteners and connected slugs, in which the parts are so constructed, arranged and coördinated, as to selectively permit the formation from a selected fastener string or slug string, of a fastener or slug, and permit the driving of such a formed fastener or slug into the work. The nail guide has a special construction adapting it for guiding strings of connected fasteners, and a string of connected slugs, and this nail guide is so constructed and so coördinated with the feeding mechanism and the throat, as to permit a selected fastener string, or a selected slug string to be shifted at will in the line of drive, to permit the feeding of either a selected fastener string, or a selected slug string into the throat. The throat itself is constructed and arranged to receive and guide, during the driving operation, either a fastener or a slug. The awl feed mechanism is constructed to permit its instant adjustment from a maximum feed required for fastening operation, to a minimum feed required for slugging operation, at the same time maintaining the lowest possible movement of the awl actuating mechanism.

It is obvious that various changes may be made in the details of construction without departing from the spirit of this invention. It is, therefore, to be understood that this invention is not to be limited to the specific construction shown and described.

Having thus described the invention, what is claimed is:

1. In a string nailing machine, the combination with a frame, of a head mounted for movement thereon, a throat and a coöperating driver mounted on said head, a work feeding awl, means for guiding a string of connected nails into said throat, a feeding member mounted on said frame, adapted to feed the string by engagement with the head of a nail on the string, together with coöperating means, adapted to cut the string to position a cut nail in said throat, and means for moving said head and said awl, adapted to move said awl and said throat alternately into and out of the line of drive.

2. In a string nailing machine, the combination with a frame, of a head mounted for movement thereon, a throat, a coöperating driver and an awl mounted on said head, means for guiding a string of connected nails into said throat, a feeding member mounted on said frame, adapted to feed the string by engagement with the head of a nail on the string, together with coöperating means, adapted to cut the string to position a cut nail in said throat, and means for moving said head and said awl, adapted to move said awl and to move said throat with said driver alternately into and out of the line of drive.

3. In a string nailing machine, the combination with a frame, of a head mounted for movement thereon, a throat and a coöperating driver mounted on said head, a work feeding awl, means for guiding a string of connected nails into said throat, a feeding and cutting member mounted on said frame, adapted to feed the string by engagement with the head of a nail on the string and then cut the string to position a cut nail in said throat, and means for moving said head and said awl, adapted to move said awl and said throat alternately into and out of the line of drive.

4. In a string nailing machine, the combination with a frame, of a head mounted for movement thereon, a throat, a coöperating driver and an awl mounted on said head, means for guiding a string of connected nails into said throat, a feeding and cutting member mounted on said frame, adapted to feed the string by engagement with the head of a nail on the string and then cut the string to position a cut nail in said throat, and means for moving said head and said awl, adapted to move said awl and to move said throat with said driver alternately into and out of the line of drive.

5. In a machine of the class described, the combination with a frame, of a head mounted for movement thereon, fastener inserting mechanism and an awl mounted on said head, and independent means for successively moving said head in the same direction.

6. In a machine of the class described, the combination with a frame, of a head mounted for movement thereon, fastener inserting mechanism and an awl mounted on said head, means for moving said head to impart a clearance movement to said awl, and means for moving said head in the same direction to impart a feeding movement to said awl.

7. In a machine of the class described, the combination with a frame, of a head mounted for movement thereon, fastener inserting mechanism and an awl mounted on said head, means for moving said head while the awl is out of the work, means for causing said awl to pierce the work, and means for moving said head in the same direction while the awl is in the work.

8. In a machine of the class described, the combination with a frame, of a head mounted for movement thereon, fastener inserting mechanism and an awl mounted on said head, means for moving said head to clear the work, and means for moving said head in the same direction to feed the work.

9. In a machine of the class described, the combination with a frame, of a head mounted for movement thereon, fastener inserting mechanism and an awl mounted on said head, means for moving said head to clear the work, means for moving said head in the same direction to feed the work, and means for varying the movement of said head.

10. In a machine of the class described, the combination with a frame, of a head mounted for movement thereon, fastener inserting mechanism and an awl mounted in said head, means for moving said head to clear the work, means for moving said head to feed the work, and means for varying the movement of said head, adapted to increase the feeding movement without increase of the clearing movement.

11. In a machine of the class described, the combination with a frame, of a head mounted for movement thereon, fastener inserting mechanism and an awl mounted on said head, means for moving said head to clear the work, means for moving said head to feed the work, and means for varying the movement of said head, adapted to decrease the clearance movement upon increase of the feeding movement.

12. In a machine of the class described, the combination with a frame, of a head mounted for movement thereon, fastener inserting mechanism and an awl mounted on said head, means for moving said head to clear the work, means for moving said head to feed the work, and means for varying the movement of said head, adapted to eliminate the clearance movement with maximum feeding movement.

13. In a machine of the class described, the combination with a frame, of a head mounted for movement thereon, fastener inserting mechanism and an awl mounted on said head, said head being adapted to position said awl and said fastener inserting mechanism alternately in the line of drive, and means for moving said head in successive steps in the same direction.

14. In a machine of the class described, the combination with a frame, of a head mounted for movement thereon, fastener inserting mechanism and an awl mounted on said head, said head being adapted to position said awl and said fastener inserting mechanism alternately in the line of drive, means for moving said head in successive steps in the same direction, and means for moving said awl to pierce the work between the steps.

15. In a machine of the class described, the combination with a frame, of a head mounted for movement thereon, fastener inserting mechanism and an awl mounted on said head, said head being adapted to position said awl and said fastener inserting mechanism alternately in the line of drive, means for moving said head to clear the work, and means for moving said head in the same direction to feed the work.

16. In a machine of the class described, the combination with a frame, of a head mounted for movement thereon, fastener inserting mechanism and an awl mounted on said head, said head being adapted to position said awl and said fastener inserting mechanism alternately in the line of drive, means for moving said head to clear the work, means for moving said head in the same direction to feed the work, and means for varying the feeding movement.

17. In a machine of the class described, the combination with a frame, of a head mounted for movement thereon, fastener inserting mechanism and an awl mounted on said head, said head being adapted to position said awl and said fastener inserting mechanism alternately in the line of drive, and means adapted to move said head in successive steps when the feeding movement is less than the distance between said awl and said fastener inserting mechanism.

18. In a machine of the class described, the combination with a frame, of a head mounted for movement thereon, fastener inserting mechanism and an awl mounted on said head, said head being adapted to position said awl and said fastener inserting mechanism alternately in the line of drive, and means adapted to move said head in successive steps when the feeding movement is less than the distance between said awl and said fastener inserting mechanism, and adapted to move said head in a single step when the feeding movement is greater than such distance.

19. In a machine of the class described, the combination with a frame, of a head mounted for movement thereon, fastener inserting mechanism and an awl mounted on said head, said head being adapted to position said awl and said fastener inserting mechanism alternately in the line of drive, and means for adjusting the movement of said head, adapted to cause movement of said head in successive steps when the feeding movement is less than the distance between said awl and said fastener inserting mechanism.

20. In a machine of the class described, the combination with a frame, of a head mounted for movement thereon, fastener inserting mechanism and an awl mounted on said head, said head being adapted to position said awl and said fastener inserting mechanism alternately in the line of drive, and means for adjusting the movement of said head, adapted to cause movement of said head in successive steps when the feeding movement is less than the distance between said awl and said fastener inserting mechanism, and adapted to cause movement of said head in a single step when the feeding movement is greater than such distance.

21. In a machine of the class described, the combination with a frame, of a head mounted for movement thereon, fastener inserting mechanism and an awl mounted on said head, said head being adapted to position said awl and said fastener inserting mechanism alternately in the line of drive, an actuator adapted to move said head to clear the work, and an actuator adapted to move said head in the same direction to feed the work.

22. In a machine of the class described, the combination with a frame, of a head mounted for movement thereon, fastener inserting mechanism and an awl mounted on said head, said head being adapted to position said awl and said fastener inserting mechanism alternately in the line of drive, an actuator adapted to move said head to clear the work, an actuator adapted to move said head in the same direction to feed the work, and means for adjusting the feeding movement of said head.

23. In a machine of the class described, the combination with a frame, of a head mounted for movement thereon, fastener inserting mechanism and an awl mounted on said head, said head being adapted to position said awl and said fastener inserting mechanism alternately in the line of drive, an actuator adapted to move said head to clear the work, an actuator adapted to move said head in the same direction to feed the work, and means for adjusting the clearing and feeding movements of said head.

24. In a machine of the class described, the combination with a frame, of a head mounted for movement thereon, fastener inserting mechanism and an awl mounted on said head, said head being adapted to position said awl and said fastener inserting mechanism alternately in the line of drive, an actuator adapted to move said head to clear the work, an actuator adapted to move said head in the same direction to feed the work, and means for adjusting the feeding movement of said head, adapted to adjust the clearing movement of said head.

25. In a machine of the class described, the combination with a frame, of a head mounted for movement thereon, fastener inserting mechanism and an awl mounted on said head, said head being adapted to position said awl and said fastener inserting mechanism alternately in the line of drive, an actuator adapted to move said head to clear the work, an actuator adapted to move said head to feed the work, and means for adjusting the feeding movement of said head, adapted to adjust the clearing movement of said head, in an inverse ratio.

26. In a machine of the class described, the combination with a frame, of a head mounted for movement thereon, fastener inserting mechanism and an awl mounted on said head, said head being adapted to position said awl and said fastener inserting mechanism alternately in the line of drive, means for guiding to said fastener inserting mechanism, strings of connected fasteners and connected slugs, feeding and cutting means, adapted to selectively feed and selectively cut said strings to selectively deliver a cut fastener or a cut slug to said fastener inserting mechanism, and means for adjusting said guiding means and said awl, constructed and arranged to adapt the machine for fastening and for slugging operations.

27. In a machine of the class described, the combination with a frame, of a head mounted for movement thereon, fastener inserting mechanism and an awl mounted on said head, said head being adapted to position said awl and said fastener inserting mechanism alternately in the line of drive, means for guiding fastener stock and slug stock to said fastener inserting mechanism, means for selectively feeding and for selectively cutting the fastener stock or slug stock, and means for varying the movement of said head, adapted to selectively adapt the machine for fastening or for slugging operations.

28. In a machine of the class described, the combination with a frame, of a head mounted for movement thereon, fastener inserting mechanism and an awl mounted on said head, said head being adapted to position said awl and said fastener inserting mechanism alternately in the line of drive, means for guiding fastener stock and slug stock to said fastener inserting mechanism, means for selectively feeding and for selectively cutting the fastener stock or slug stock, means for moving said head to clear the work and to feed the work, and means for varying the movement of said head, adapted to selectively adapt the machine for fastening or for slugging operations.

29. In a machine of the class described, the combination with a frame, of a head mounted for movement thereon, fastener inserting mechanism and an awl mounted on said head, said head being adapted to position said awl and said fastener inserting mechanism alternately in the line of drive, means for guiding fastener stock and slug stock to said fastener inserting mechanism, means for selectively feeding and for selectively cutting the fastener stock or slug stock, means for moving said head to clear the work and to feed the work, and means for increasing the feeding movement of said head without increase of its clearing movement, adapted to selectively adapt the machine for fastening or for slugging operations.

30. In a machine of the class described, the combination with a frame, of a head mounted for movement thereon, fastener inserting mechanism and an awl mounted on said head, said head being adapted to position said awl and said fastener inserting mechanism alternately in the line of drive, means for guiding fastener stock and slug stock to said fastener inserting mechanism, means for selectively feeding and for selectively cutting the fastener stock or slug stock, and means for adjusting said guiding means with respect to said fastener inserting mechanism, adapted to selectively position in coöperative relation with said fastener inserting mechanismm a fastener or a slug.

31. In a machine of the class described, the combination with a frame, of a head mounted for movement thereon, fastener inserting mechanism and an awl mounted on said head, said head being adapted to position said awl and said fastener inserting mechanism alternately in the line of drive, means for guiding fastener stock and slug stock to said fastener inserting mechansim, means for selectively feeding and for selectively cutting the fastener stock or slug stock, and means for adjusting said guiding means with respect to said feeding and cutting means and said fastener inserting mechanism, adapted to selectively position in coöperative relation with said fastener inserting mechanism a fastener or a slug.

32. In a machine of the class described, the combination with a frame, of a head mounted for movement thereon, fastener inserting mechanism and an awl mounted on said head, and interconnected means operating independently for successively moving said head laterally in the same direction.

33. In a machine of the class described, the combination with a frame, of a head mounted for movement thereon, fastener inserting mechanism and an awl mounted on said head, and means having maintained connections with said head but operating independently for successively moving said head laterally in the same direction.

34. In a machine of the class described, the combination with a frame, of a head mounted for movement thereon, fastener inserting mechanism and an awl mounted on said head, and actuators adapted to respectively impart lateral movements to said head in the same direction.

35. In a machine of the class described, the combination with a frame, of a head mounted for movement thereon, fastener inserting mechanism and an awl mounted on said head, means for moving said head to impart a clearance movement to said awl, means for moving said head in the same direction to impart a feeding movement to said awl, and means for varying the feeding movement adapted to vary the total movement of said awl.

36. In a machine of the class described, the combination with a frame, of a head mounted for movement thereon, fastener inserting mechanism and an awl mounted on said head, means for moving said head to impart a clearance movement to said awl, means for moving said head to impart a feeding movement to said awl, and means for varying the clearing movement in the opposite sense as the feeding movement and the total movement of said awl.

37. In a machine of the class described, the combination with a frame, of a head mounted for movement thereon, a throat and an awl mounted on said head and adapted for movement therewith into and out of the line of drive, and independent means for moving said head in successive steps in the same directions.

38. In a machine of the class described, the combination with a frame, of a head mounted for movement thereon, a throat and an awl mounted on said head and adapted for movement therewith into and out of the line of drive, means for moving said head while the awl is clear of the work, and means for moving said head in the same direction while the awl is in the work.

39. In a machine of the class described, the combination with a frame, of a head mounted for movement thereon, a throat and an awl mounted on said head and adapted for movement therewith into and out of the line of drive, means for moving said head laterally while the awl is clear of the work, means for moving said head in the same direction while the awl is in the work, and means for varying the lateral movement of said head.

40. In a machine of the class described, the combination with a frame, of a head mounted for movement thereon, a throat and an awl mounted on said head and adapted for movement therewith into and out of the line of drive, means for moving said head while the awl is clear of the work, means for moving said head in the same direction while the awl is in the work, and means for varying the feeding movement.

41. In a machine of the class described, the combination with a frame, of a head mounted for movement thereon, a throat and an awl mounted on said head and adapted for movement therewith into and out of the line of drive, means for moving said head while the awl is clear of the work, means for moving said head in the same direction while the awl is in the work, and means for varying the feeding movement adapted to vary the clearing movement in the opposite sense.

42. In a machine of the class described, the combination with a frame, of a head mounted for movement thereon, a throat and an awl mounted on said head and adapted for movement therewith into and out of the line of drive, means for moving said head while the awl is clear of the work, means for moving said head in the same direction while the awl is in the work, and means for varying the feeding movement adapted to eliminate the clearing movement.

43. In a machine of the class described, the combination with a frame, of a head mounted for movement thereon, a throat and an awl mounted on said head and adapted for movement therewith into and out of the line of drive, means for moving said head while the awl is clear of the work, means for moving said head in the same direction while the awl is in the work, and means for varying the feeding movement adapted to eliminate the clearing movement when the total movement reaches the maximum movement of said awl.

In testimony whereof I affix my signature this 12th day of July, 1918.

JOHN H. BRUNINGA.